(12) United States Patent
Yang (10) Patent No.: US 9,340,255 B2
(45) Date of Patent: May 17, 2016

(54) ADJUSTABLE SHOE MOUNTING STRUCTURE FOR BICYCLE BRAKE DEVICE

(71) Applicant: Tzu-Yi Yang, Changhua (TW)

(72) Inventor: Tzu-Yi Yang, Changhua (TW)

(73) Assignee: TEKTRO TECHNOLOGY CORP, Changhua (TW)

( * ) Notice: Subject to any disclaimer, the term of this patent is extended or adjusted under 35 U.S.C. 154(b) by 38 days.

(21) Appl. No.: 14/501,052

(22) Filed: Sep. 30, 2014

(65) Prior Publication Data

US 2016/0090148 A1    Mar. 31, 2016

(51) Int. Cl.
*B62L 1/06* (2006.01)
*B62L 1/12* (2006.01)
*B62L 1/10* (2006.01)
*B62L 1/14* (2006.01)

(52) U.S. Cl.
CPC ... *B62L 1/12* (2013.01); *B62L 1/10* (2013.01); *B62L 1/14* (2013.01)

(58) Field of Classification Search
CPC .............. B62L 1/10; B62L 3/02; B62L 1/12; B62L 3/00; B62L 1/02
USPC ................. 188/24.19, 24.21, 24.22
See application file for complete search history.

(56) References Cited

U.S. PATENT DOCUMENTS

| | | | | | |
|---|---|---|---|---|---|
| 3,305,048 | A | * | 2/1967 | Brilando | B62L 1/005 188/24.12 |
| 4,051,924 | A | * | 10/1977 | Yoshigai | B62L 1/005 188/220.6 |
| 4,441,592 | A | * | 4/1984 | Everett | B62L 1/005 188/24.12 |
| 4,896,753 | A | * | 1/1990 | Sule | B62L 1/00 188/24.19 |
| 4,938,318 | A | * | 7/1990 | Ishibashi | B62L 1/16 188/196 M |
| 4,946,007 | A | * | 8/1990 | Pederson | B62L 1/14 188/24.14 |
| 5,293,964 | A | * | 3/1994 | Li | B62L 1/14 188/24.19 |
| 5,469,939 | A | * | 11/1995 | Chen | B62L 1/14 188/24.21 |
| 5,501,301 | A | * | 3/1996 | Nishimura | B62L 1/14 188/24.12 |
| 5,547,046 | A | * | 8/1996 | Chen | B62L 1/14 188/24.12 |
| 5,564,531 | A | * | 10/1996 | Lumpkin | B62L 1/14 188/24.12 |
| 5,636,716 | A | * | 6/1997 | Sugimoto | B62L 1/14 188/24.19 |
| 6,039,153 | A | * | 3/2000 | Sugimoto | B62L 1/005 188/24.19 |
| 6,125,973 | A | * | 10/2000 | Irvine | F16D 65/092 188/24.22 |
| 6,155,383 | A | * | 12/2000 | Sugimoto | B62L 1/005 188/24.12 |
| 6,874,601 | B2 | * | 4/2005 | Kuo | B62L 1/005 188/24.22 |
| 7,537,094 | B1 | * | 5/2009 | Kato | B62L 1/10 188/2 D |
| 2004/0074705 | A1 | * | 4/2004 | Peyre | B60T 1/06 188/24.12 |
| 2012/0018258 | A1 | * | 1/2012 | Auger | B60T 1/06 188/24.22 |

* cited by examiner

*Primary Examiner* — Robert A Siconolfi
*Assistant Examiner* — Mahbubur Rashid
(74) *Attorney, Agent, or Firm* — Yuwen Guo (57) ABSTRACT

An adjustable shoe mounting structure for bicycle brake device is disclosed. Users may use the first adjusting member of the adjusting assembly to be turned relative to the second adjusting member of the adjusting assembly. That is, the first adjusting member may be pulled inwardly to turn an angle. The first adjusting member uses the elasticity of the spring to move axially and the brake shoe may be adjusted the angle by matching convex teeth with different heights of the first adjusting member and the second adjusting member. It may achieve the efficiency of adjusting brake shoe. Also, it has simple structure and is easy to operate while adjusting.

2 Claims, 8 Drawing Sheets

ADJUSTABLE SHOE MOUNTING STRUCTURE FOR BICYCLE BRAKE DEVICE

FIELD OF THE INVENTION

The present invention relates to a bicycle, and more particularly to an adjustable shoe mounting structure for bicycle brake device.

BACKGROUND OF THE INVENTION

In general, one of the brake shoes made by rubber of a bicycle may be abraded more seriously after being used for a long time, or two brake shoes do not balance after assembling.

Because of unbalance, the efficiency of braking may be reduced, and it may cause noise, even vibration while braking.

It is difficult or complex to fine tune the distance between two brake shoes. Therefore, the users usually ignore it to adjust.

However, the safety for a rider is not enough. If the brake shoes are not balanced, the friction is not equal and it is easy to reduce the braking efficiency, and then the safety of riders may be influenced.

SUMMARY OF THE INVENTION

Therefore, an adjustable shoe mounting structure for bicycle brake device is provided. Users may use the first adjusting member of the adjusting assembly to be turned relative to the second adjusting member of the adjusting assembly. That is, the first adjusting member may be pulled inwardly to turn an angle. The first adjusting member uses the elasticity of the spring to move axially and the brake shoe may be adjusted the angle by matching convex teeth with different heights of the first adjusting member and the second adjusting member. It may achieve the efficiency of adjusting brake shoe. Also, it has simple structure and is easy to operate while adjusting.

An adjustable shoe mounting structure for bicycle brake device is disclosed and arranged at at least one brake arm of the bicycle brake device. The structure comprises a shoe mount, substantially having a rectangular shape and connected at an inner side of the brake arm orthogonally with each other; a screw member, having a screw portion and a top push portion connected with each other, the screw portion is passed through the brake mount and a through hole of the brake arm sequentially, and the top push portion is against an inner side of the brake mount; a brake shoe, fastened inside the brake mount; an adjusting assembly, adjustable arranged between the brake arm and the brake mount and sleeved on the screw portion of the screw member, a first side of the adjusting assembly is against an outer side of the brake mount, and a second side of the adjusting assembly opposite to the first side thereof is passed through the through hole of the brake arm; a spring, sleeved on the screw portion of the screw member and disposed in the through hole of the brake arm, a first end of the spring is against a part of the adjusting assembly partially disposed in the through hole of the brake arm; and a fixing nut, screwed at the screw portion of the screw member disposed at the outer side of the brake arm.

The brake shoe may be moved axially in the through hole of the brake arm by the adjusting assembly to adjust a gap between the brake shoe and a rim of the bicycle through the elasticity of the spring.

In some embodiments, the adjusting assembly includes a first adjusting member and a second adjusting member, the first adjusting member has a first plate part and a first convex teeth part, the second adjusting member has a second plate part, a second convex teeth part, and a convex post part, the first plate part is against an outer side of the brake mount, the first convex teeth part is extending from a center of the first plate part to the brake arm, the second plate part is disposed in the through hole of the brake arm, the second convex teeth part is extending from a center of the second plate part to the brake mount, the convex post part is extending toward the brake arm and disposed in the through hole of the brake arm, thereby two ends of the spring are respectively against the convex post part of the second adjusting member of the adjusting assembly and the fixing nut, the first convex teeth part and the second convex teeth part have convex teeth with different heights, the convex post part of the second adjusting member is against the spring and moves axially forward and backward with the elasticity of the spring, and further an angle of the brake shoe is adjusted by matching the convex teeth with different heights of the first convex teeth part and the second convex teeth part.

In some embodiments, the bicycle brake device is C-clip or V-clip structure.

DESCRIPTION OF THE PREFERRED EMBODIMENT

Figure 1:
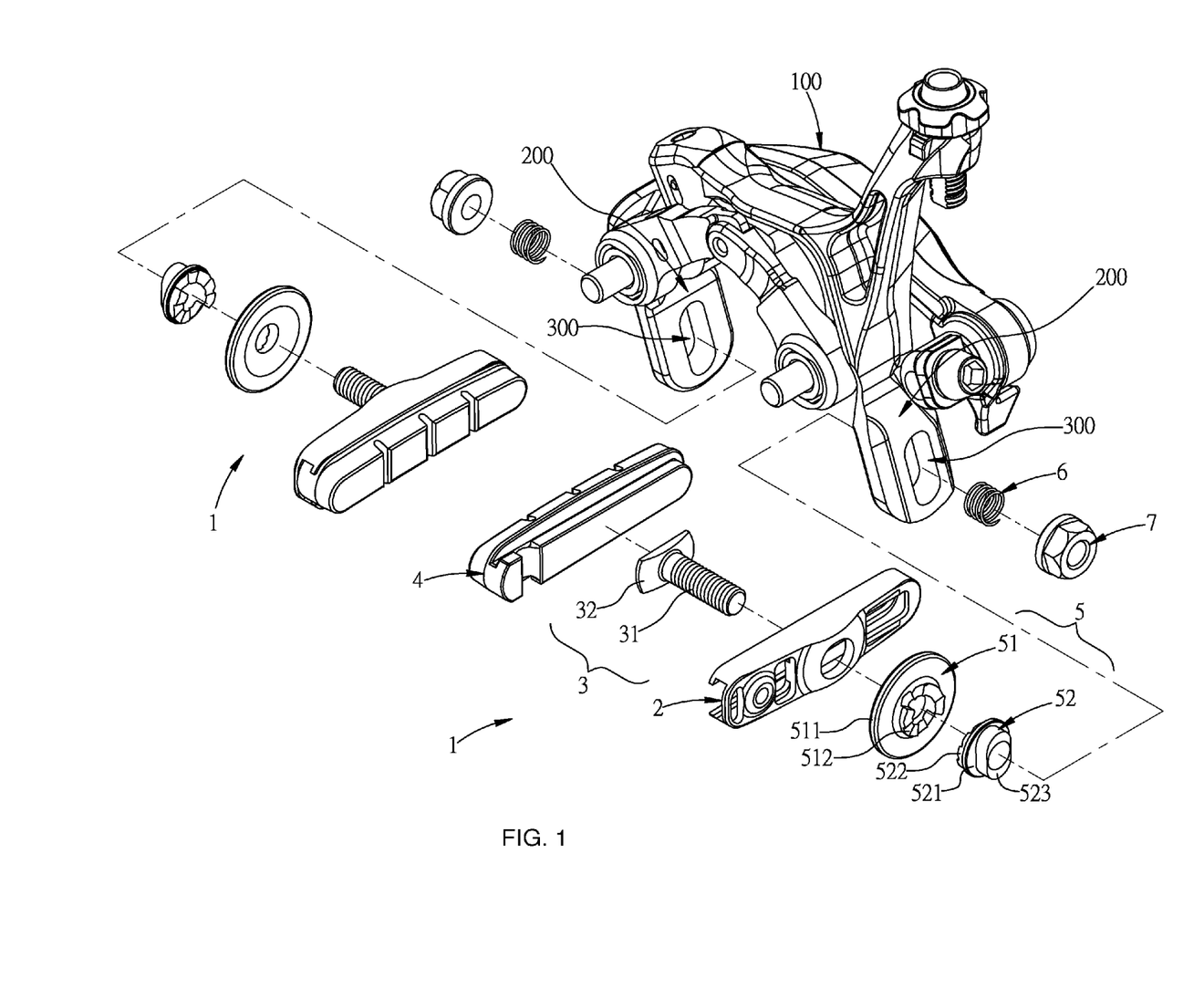
FIG. 1 is an exploded view of an adjustable shoe mounting structure for bicycle brake device according to present invention.
Figure 2:
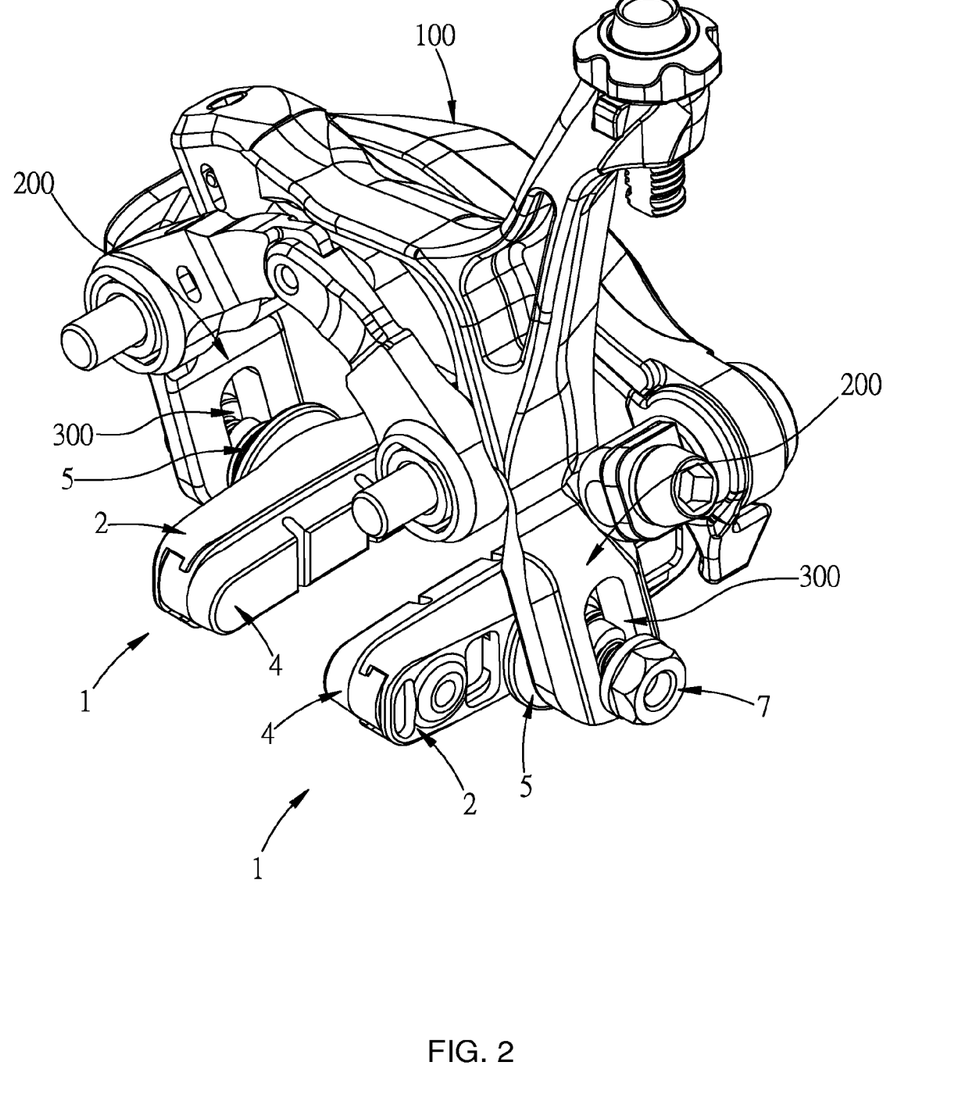
FIG. 2 is a perspective view of the adjustable shoe mounting structure for bicycle brake device according to present invention.
Figure 3:
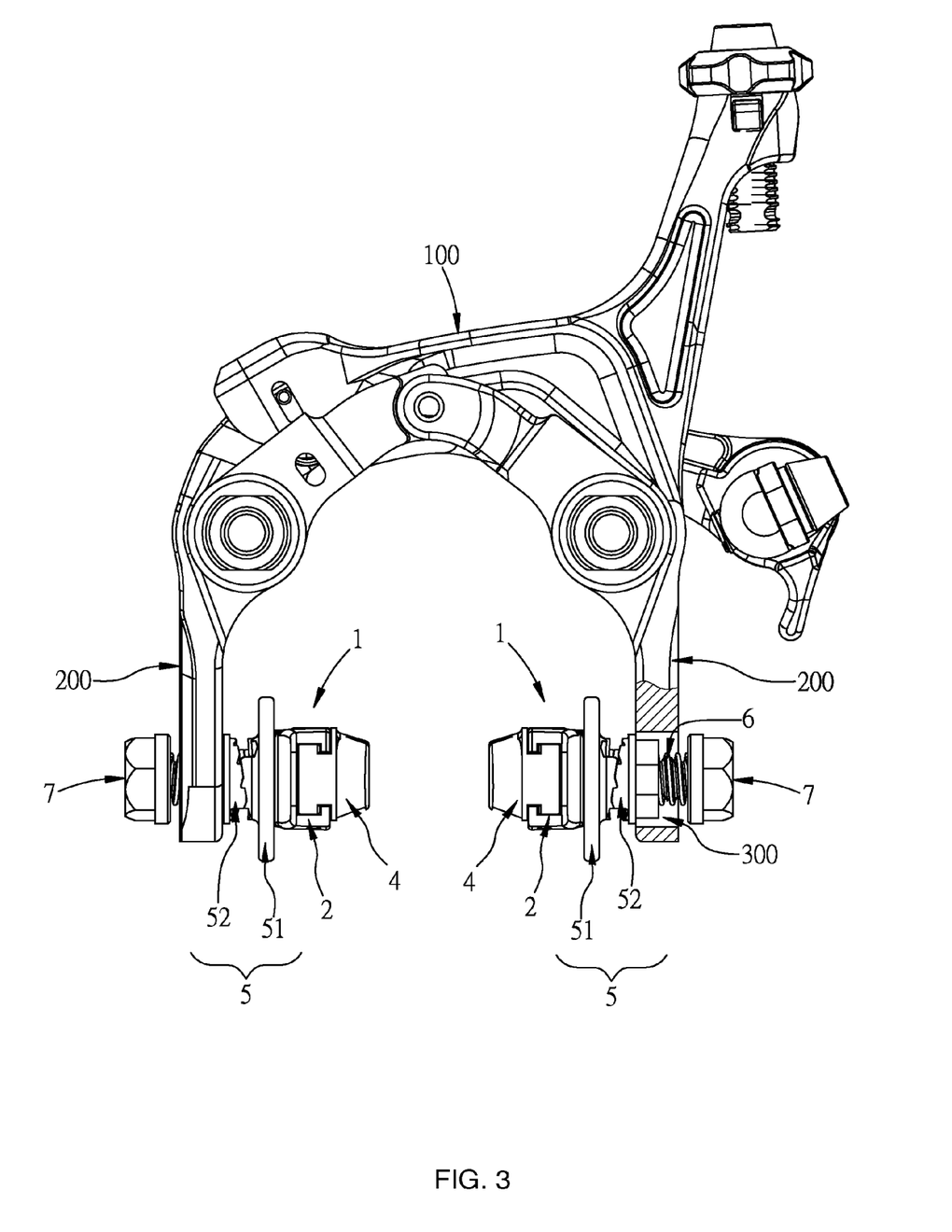
FIG. 3 is a front view of the adjustable shoe mounting structure for bicycle brake device according to present invention.
Figure 4:
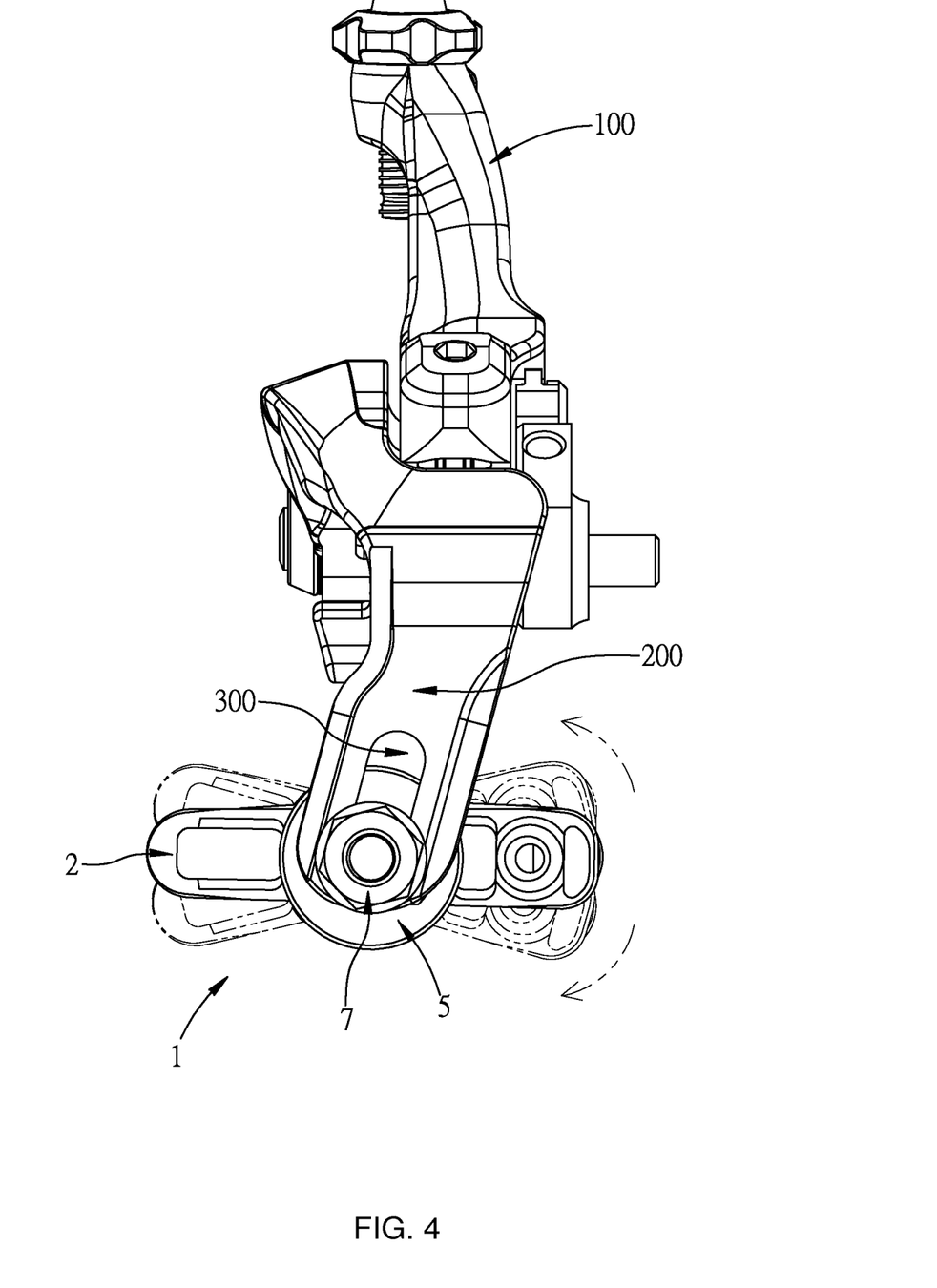
FIG. 4 is a side view of the adjustable shoe mounting structure for bicycle brake device according to present invention.
Figure 5:
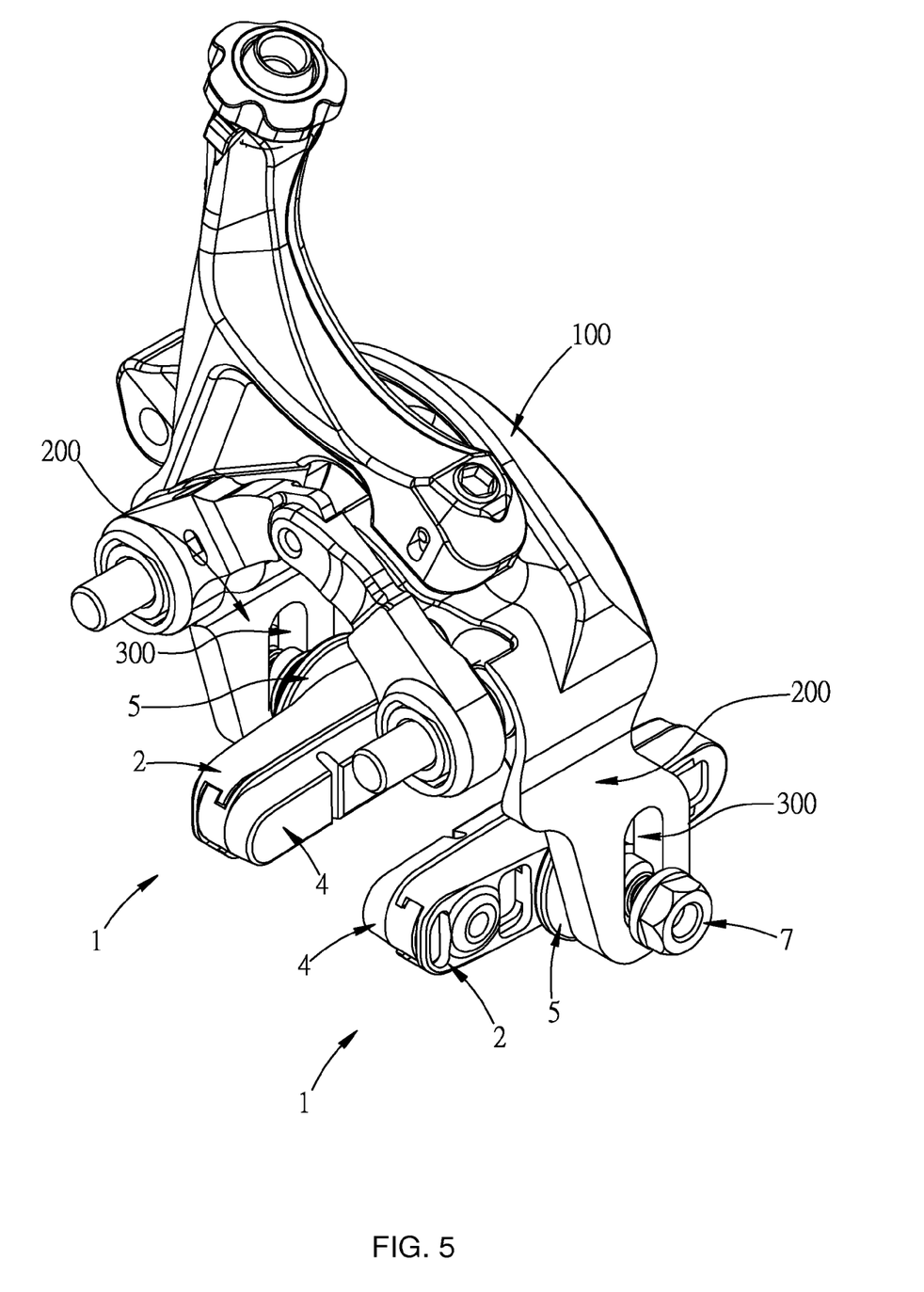
FIG. 5 is another view of the adjustable shoe mounting structure for bicycle brake device according to present invention.
Figure 6:
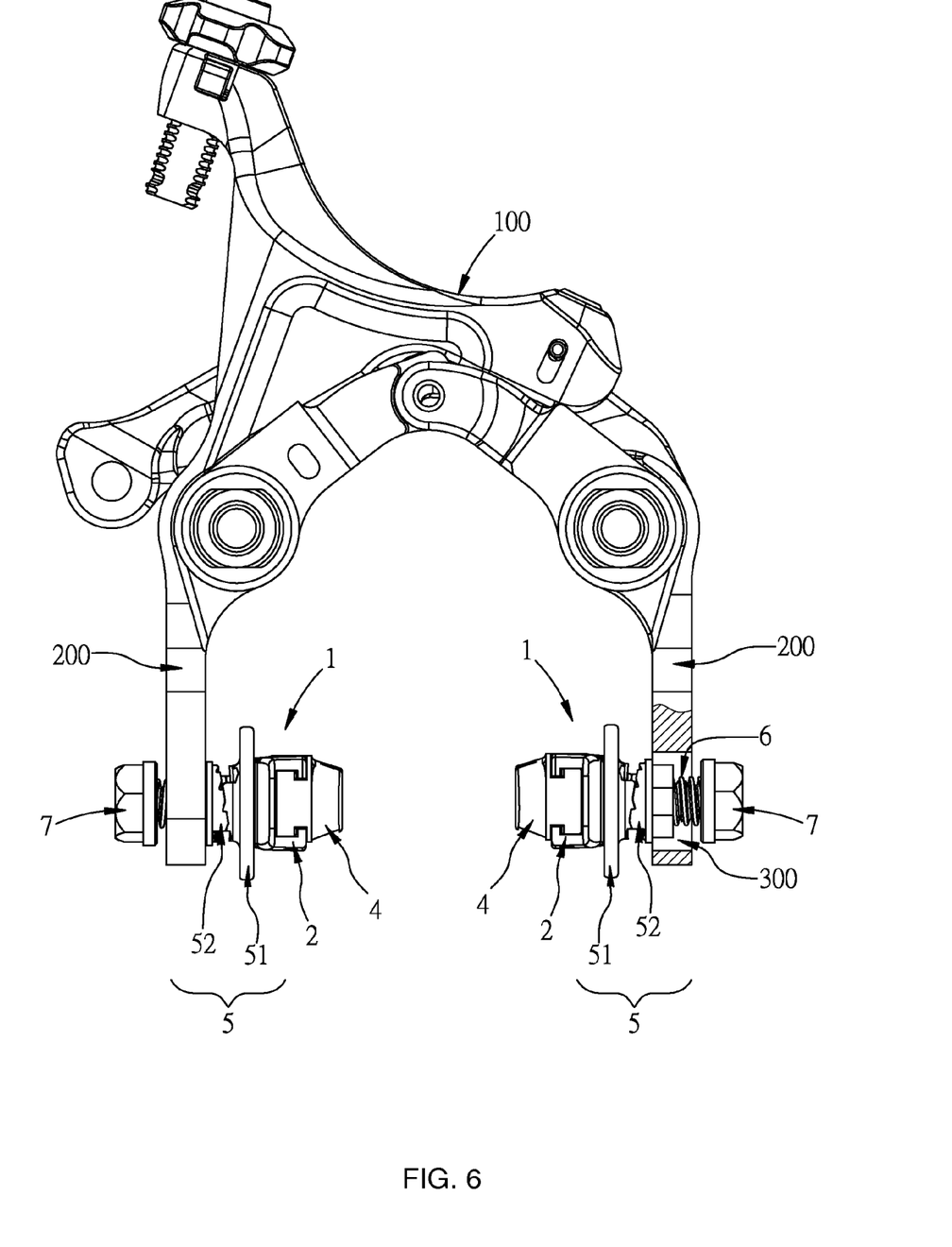
FIG. 6 is a rear view of the adjustable shoe mounting structure for bicycle brake device according to present invention.
Figure 7:
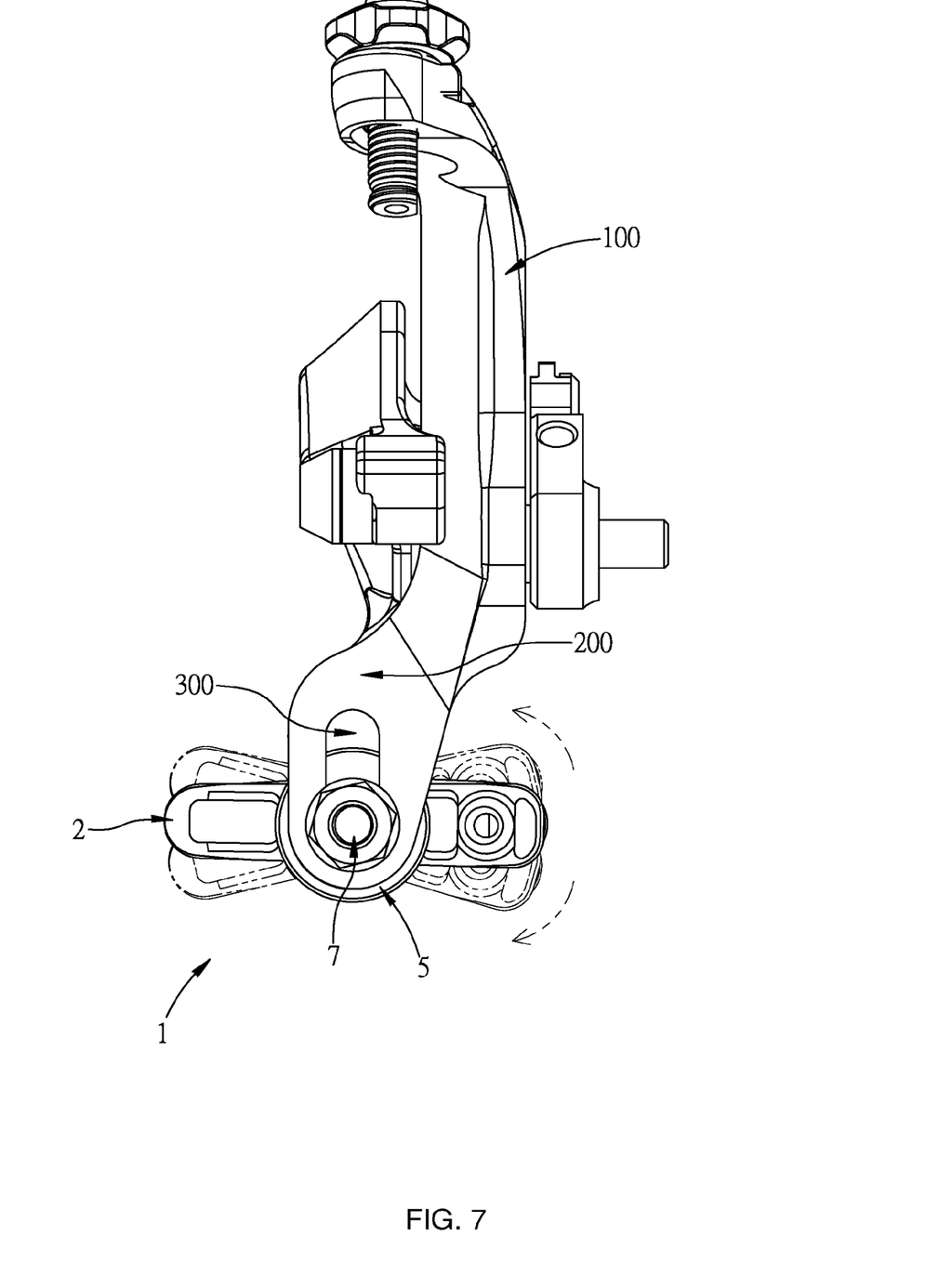
FIG. 7 is another side view of the adjustable shoe mounting structure for bicycle brake device according to present invention.
Figure 8:
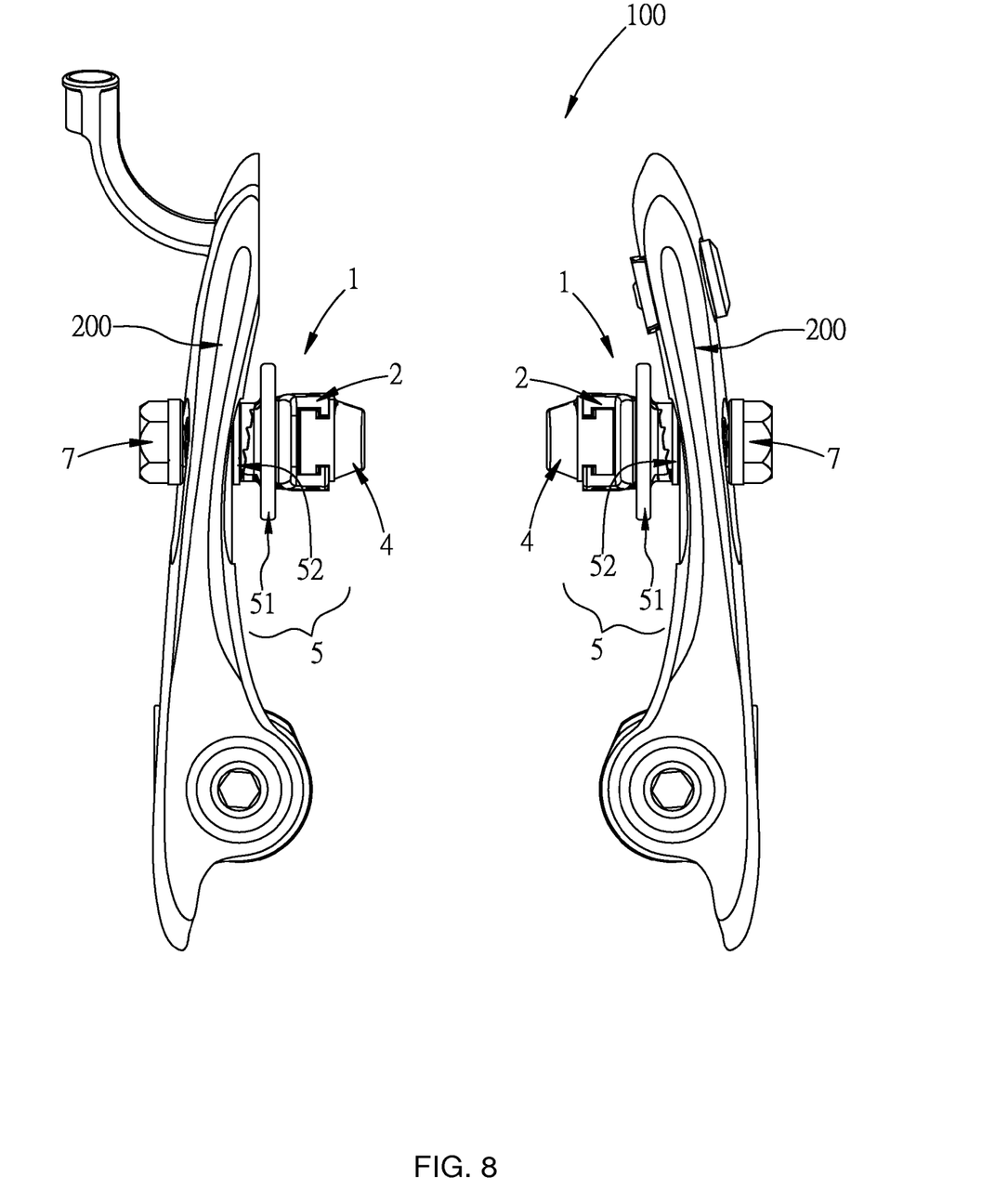
FIG. 8 is an embodiment of the adjustable shoe mounting structure for bicycle brake device with a V-clip structure.

FIG. 1 is an exploded view of an adjustable shoe mounting structure for bicycle brake device according to present invention. FIG. 2 is a perspective view of the adjustable shoe mounting structure for bicycle brake device according to present invention. FIG. 3 is a front view of the adjustable shoe mounting structure for bicycle brake device according to present invention. FIG. 4 is a side view of the adjustable shoe mounting structure for bicycle brake device according to present invention. FIG. 5 is another view of the adjustable shoe mounting structure for bicycle brake device according to present invention. FIG. 6 is a rear view of the adjustable shoe mounting structure for bicycle brake device according to present invention. FIG. 7 is another side view of the adjustable shoe mounting structure for bicycle brake device according to present invention. FIG. 8 is an embodiment of the adjustable shoe mounting structure for bicycle brake device with a V-clip structure.

Please refer to FIG. 1 to FIG. 8, the adjustable shoe mounting structure 1 for bicycle brake device 100 which is arranged at at least one brake arm 200 of the bicycle brake device 100. The bicycle brake device 100 may be C-clip structure (FIGS. 1 to 7) or V-clip structure (FIG. 8).

The adjustable shoe mounting structure 1 may comprise a shoe mount 2, a screw member 3, a brake shoe 4, an adjusting assembly 5, a spring 6, and a fixing nut 7.

The shoe mount 2 may substantially have a rectangular shape, such as the brake shoe 4, and be connected at an inner side of the brake arm 200 orthogonally with each other.

The screw member 3 may have a screw portion 31 and a top push portion 32 connected with each other. The screw portion 31 may be passed through the brake mount 2 and a through hole 300 of the brake arm 200 sequentially, and the top push portion 32 may be against an inner side of the brake mount 2.

The brake shoe 4 may be fastened inside the brake mount 2.

The adjusting assembly 5 may be adjustable arranged between the brake arm 200 and the brake mount 2 and sleeved on the screw portion 31 of the screw member 3. A first side of the adjusting assembly 5 may be against an outer side of the brake mount 2, and a second side of the adjusting assembly 5 opposite to the first side thereof may be passed through the through hole 300 of the brake arm 200.

In detail, the adjusting assembly 5 may include a first adjusting member 51 and a second adjusting member 52. The first adjusting member 51 may have a first plate part 511 and a first convex teeth part 512. The second adjusting member 52 may have a second plate part 521, a second convex teeth part, 522 and a convex post part 523. The first plate part 511 may be against an outer side of the brake mount 2, and the first convex teeth part 512 may be extending from a center of the first plate part 511 to the brake arm 200. The second plate part 521 may be disposed in the through hole 300 of the brake arm 200, the second convex teeth part 522 may be extending from a center of the second plate part 521 to the brake mount 2, and the convex post part 523 may be extending toward the brake arm 200 and disposed in the through hole 300 of the brake arm 200.

The spring 6 may be sleeved on the screw portion 31 of the screw member 3 and disposed in the through hole 300 of the brake arm 200. A first end of the spring 6 may be against a part of the adjusting assembly 5 partially disposed in the through hole 300 of the brake arm 200. That is, the first end of the spring 6 is against the convex post part 523 of the second adjusting member 52 of the adjusting assembly 5.

The fixing nut 7 may be screwed at the screw portion 31 of the screw member 3 disposed at the outer side of the brake arm 200 (that is, an outer side of the convex post part 523). And a second end of the spring 6 opposite to the first end may be against the fixing nut 7.

Thereby, two ends of the spring 6 are respectively against the convex post part 523 of the second adjusting member 52 of the adjusting assembly 5 and the fixing nut 7. The first convex teeth part 511 and the second convex teeth part 521 have convex teeth with different heights, the convex post part 523 of the second adjusting member 52 is against the spring 6 and moves axially forward and backward with the elasticity of the spring 6, and further an angle of the brake shoe may be adjusted by matching the convex teeth with different heights of the first convex teeth part 511 and the second convex teeth part 521.

The brake shoe 4 may be moved axially in the through hole 300 of the brake arm 200 by the adjusting assembly 5 to adjust a gap between the brake shoe 4 and a rim of the bicycle through the elasticity of the spring 6.

Therefore, users may use the first adjusting member 51 of the adjusting assembly 5 to be turned relative to the second adjusting member 52 of the adjusting assembly 5 without any tools. That is, the first adjusting member 51 may be pulled inwardly to turn an angle. The first adjusting member 51 uses the elasticity of the spring 6 to move axially and the brake shoe 4 may be adjusted the angle by matching convex teeth with different heights of the first adjusting member 51 and the second adjusting member 52. It may achieve the efficiency of adjusting brake shoe. Also, it has simple structure and is easy to operate while adjusting.

What is claimed is:

1. An adjustable shoe mounting structure for bicycle brake device, arranged at at least one brake arm of the bicycle brake device, the structure comprising:
   a shoe mount, substantially having a rectangular shape and connected at an inner side of the brake arm orthogonally with each other;
   a screw member, having a screw portion and a top push portion connected with each other, the screw portion is passed through the shoe mount and a through hole of the brake arm sequentially, and the top push portion is against an inner side of the shoe mount;
   a brake shoe, fastened inside the shoe mount;
   an adjusting assembly, adjustable arranged between the brake arm and the shoe mount and sleeved on the screw portion of the screw member, a first side of the adjusting assembly is against an outer side of the shoe mount, and a second side of the adjusting assembly opposite to the first side thereof is passed through the through hole of the brake arm;
   a spring, sleeved on the screw portion of the screw member and disposed in the through hole of the brake arm, one end of the spring is against a part of the adjusting assembly partially disposed in the through hole of the brake arm; and
   a fixing nut, screwed at the screw portion of the screw member disposed at the outer side of the brake arm, and a second end of the spring opposite to the first end is against the fixing nut;
   wherein the brake shoe is moved axially in the through hole of the brake arm by the adjusting assembly to adjust a gap between the brake shoe and a rim of the bicycle through the elasticity of the spring; and
   wherein the adjusting assembly includes a first adjusting member and a second adjusting member, the first adjusting member has a first plate part and a first convex teeth part, the second adjusting member has a second plate part, a second convex teeth part, and a convex post part, the first plate part is against an outer side of the shoe mount, the first convex teeth part is extending from a center of the first plate part to the brake are, the second plate part is disposed in the through hole of the brake arm, the second convex teeth part is extending from a center of the second plate part to the shoe mount, the convex post part is extending toward the brake arm and disposed in the through hole of the brake arm, thereby two ends of the spring are respectively against the convex post part of the second adjusting member of the adjusting assembly and the fixing nut, the first convex teeth part and the second convex teeth part have convex teeth with different heights, the convex post part of the second adjusting member is against the spring and moves axially forward and backward with the elasticity of the spring, and further an angle of the brake shoe is adjusted by matching the convex teeth with different heights of the first convex teeth part and the second convex teeth part.

2. A structure as claimed in claim 1, wherein the bicycle brake device is C-clip or V-clip structure.

* * * * *